United States Patent
Jaekel

(10) Patent No.: US 6,718,812 B1
(45) Date of Patent: Apr. 13, 2004

(54) METHOD FOR MAKING A BEAM FROM A METAL SHEET

(75) Inventor: Federico G. Jaekel, Richmond Hill (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 10/110,342

(22) PCT Filed: Oct. 18, 2000

(86) PCT No.: PCT/CA00/01205

§ 371 (c)(1),
(2), (4) Date: Apr. 11, 2002

(87) PCT Pub. No.: WO01/28703

PCT Pub. Date: Apr. 26, 2001

Related U.S. Application Data

(60) Provisional application No. 60/160,208, filed on Oct. 19, 1999.

(51) Int. Cl.[7] .............................................. B21D 39/02
(52) U.S. Cl. ............................. 72/325; 72/368; 228/170
(58) Field of Search ........................ 72/325, 324, 368, 72/177, 129; 83/51, 870; 228/143, 170

(56) References Cited

U.S. PATENT DOCUMENTS

| | | | | |
|---|---|---|---|---|
| 64,756 A | * | 5/1867 | Myers | 165/121 |
| 376,914 A | * | 1/1888 | Russell | 72/325 |
| 966,952 A | * | 8/1910 | Remington | 72/324 |
| 1,281,649 A | * | 10/1918 | Peterson | 72/325 |
| 3,020,636 A | * | 2/1962 | Ayton | 72/325 |
| 3,029,155 A | * | 4/1962 | Maier | 72/337 |

FOREIGN PATENT DOCUMENTS

| | | | |
|---|---|---|---|
| FR | 2 033 349 A | 12/1970 | |
| GB | 768261 | * 2/1957 | 72/325 |
| JP | 55 030334 A | 3/1980 | |
| JP | 04 084601 A | 3/1992 | |
| WO | WO97/27009 A | 7/1997 | |

* cited by examiner

*Primary Examiner*—Daniel C. Crane
(74) *Attorney, Agent, or Firm*—Pillsbury Winthrop LLP

(57) ABSTRACT

A method for making a beam from a metal sheet (10), includes the steps of providing a metal sheet having opposite first and second side edges (12, 14) extending longitudinally along opposing sides of the metal sheet, and a first and a second generally parallel opposing face surfaces (16, 18) provided between the first and second edges. The first and second generally parallel opposing faces define a thickness of the metal sheet therebetween. The thickness of the metal sheet is split at one of the first and second side edges to form first and second integral flanges (28, 30, 32, 34) from a portion of the metal sheet such that inner ends of the first and second flanges remain integrally connected with an unsplit portion (44) of the metal sheet. The first and second flanges are then bent so as to provide the metal sheet with a tubular portion extending along one side of and integrally formed with the unsplit portion. The first and second flanges are then fixed against movement relative to one another.

7 Claims, 6 Drawing Sheets

METHOD FOR MAKING A BEAM FROM A METAL SHEET

This application is the National Phase of International Application PCT/CA00/01205 filed Oct. 18, 2000 which designated the U.S. and that International Application was published under PCT Article 21(2) in English, which claims the benefit of Provisional Application Ser. No. 60/160,208, filed Oct. 19, 1999.

FIELD OF THE INVENTION

The present invention relates to a method for making a beam from a metal sheet. In particular, the present invention relates to a method for making a tubular beam from a sheet wherein one or both of the edges of the sheet are split so as to form flanges, the flanges are then bent so as to provide one or more tubular portions along the edges of the beam.

BACKGROUND OF THE INVENTION

Elongated metal beams are used throughout the frame of a motor vehicle. One such beam, for example, is the intrusion beam used in motor vehicle doors. In constructing such beams, special attention must be paid to ensuring that the beam is sufficiently rigid to withstand the loads and impacts applied to it. However, the beam should also be kept lightweight enough to ensure that the resulting vehicle is fuel efficient and easy to handle. To this end, vehicle frame manufacturers have typically utilized I-beams and stamped or roll-formed metal beams. The common desired feature among all of these known beam or frame members is that they have a relatively high resistance to bending and torsion without unnecessarily adding to the overall weight of the vehicle.

While these known frame members have been viewed as satisfactory, it would be desirable to provide an alternative, cost-effective and relatively simple method for providing a frame member that achieves the desired bending and torsional resistance and weight characteristics for a vehicle frame.

SUMMARY OF THE INVENTION

It is therefore an object of the present invention to provide an alternative method for making a lightweight beam having high resistance to deformation.

According to the method of the present invention, a metal sheet is provided. The metal sheet has first and second side edges extending longitudinally along opposing sides of the metal sheet and first and second generally parallel opposing face surfaces provided between the first and second side edges. First and second integral flanges are formed from a portion of the metal sheet by splitting the portion of the metal sheet at one of the first and second side edges while leaving a portion of the metal sheet unsplit. Then the first and second flanges are bent so as to provide the metal sheet with a tubular portion extending along one side of and integrally formed with the unsplit portion. Then, the first and second flanges are fixed against movement relative to one another.

According to the method of the present invention, the thickness of the metal sheet may be split in the manner described above by using a splitting tool. The manner in which the flanges are bent may be in one of two ways. The first way is to bend the flanges so that the free ends are moved towards the unsplit portion of the sheet and then fix the free ends of the flanges to the first and second surfaces of the metal sheet by welding or the like. As a result, the flanges will form two tubular portions. Where both edges on opposite sides of the metal sheet are split, two tubular portions are formed on both sides of the web, with a central unsplit web extending therebetween. The second way to bend the flanges is to bring the free ends thereof into engagement with one another and then secure the free ends together by welding of the likes so as to provide the metal sheet with a single tubular portion. Where both edges on opposite sides of the metal sheet are split, a single tubular portion is formed on both sides of the web, with the web extending therebetween.

While the present invention contemplates that the splitting can be accomplished on only one side of the sheet metal, leaving a tubular portion (either single or double tubular portion) on one side of the unsplit portion of the metal sheet, in the preferred embodiment, both of the opposite longitudinal edges are split to provide tubular portions (either single or double) on opposite side of an unsplit portion therebetween. It can be appreciated that the method of the present invention is a simple and inexpensive way of forming a tubular beam from a metal sheet. The tubular beam resulting from the method of the present invention may be used in the frame of the motor vehicle or may be used at any other point in the vehicle where the use of such a member (either straight or bent) would be desired. For example, the beam could be used in a vehicle door as an intrusion beam or in a vehicle roof for support. Also, the method of the present invention may be applied to other fields outside the automotive industry.

DETAILED DESCRIPTION OF THE PREFERRED EMBODIMENT OF THE INVENTION

Figure 1:
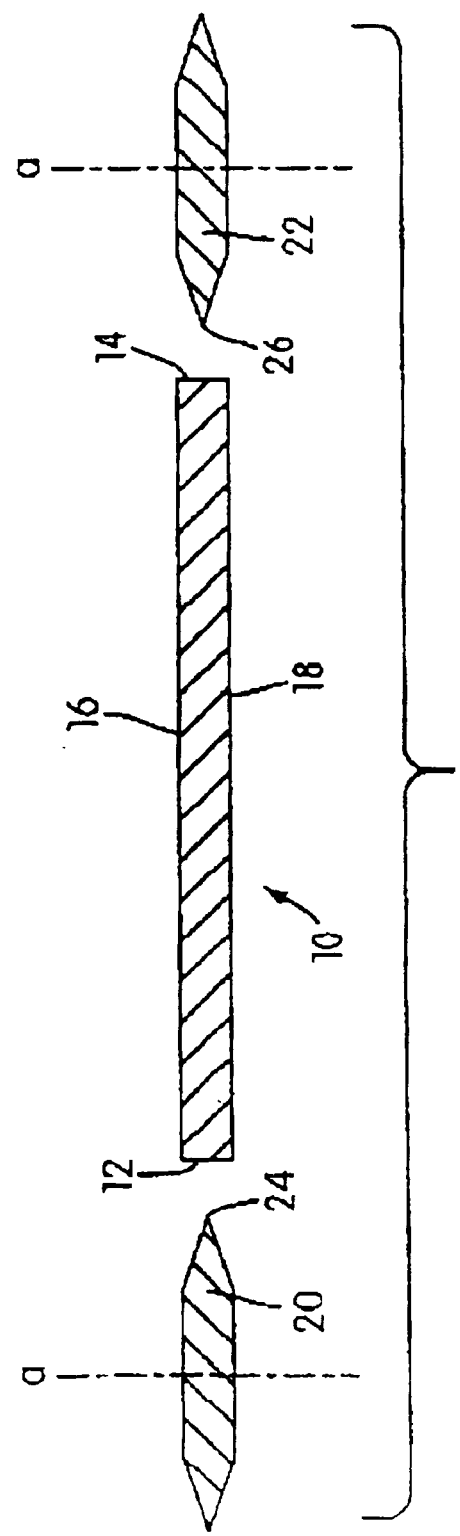
FIG. 1 is a cross-sectional view of a metal sheet with a pair of splitting tools schematically shown and positioned adjacent to the side edges thereof in accordance with the present invention.

FIG. 1 shows a metal sheet 10 having first and second side edges 12, 14 extending longitudinally with respect to the sheet 10 and a pair of generally parallel first and second face surfaces 16, 18 extending between the side edges 12, 14. A pair of splitting tools 20, 22 are shown schematically in FIG. 1 and extend longitudinally alongside the sheet 10 adjacent edges 12, 14. These splitting tools 20, 22 have sharpened edges 24, 26 facing inwardly towards the side edges 12, 14 of the metal sheet 10. The sharpened edges 24, 26 are designed to split or cut the sheet as the splitting tools 20, 22 are engaged with the side edges 12, 14 of the sheet 10 and moved inwardly with respect to the sheet 10.

Although the splitting tools 20, 22 are shown schematically in FIG. 1, it is to be understood that they may be of any type of tool suitable for splitting through the thickness of a metal sheet. Preferably, the tools 20, 22 each comprise a splitting wheel or roller rotatable about an axis a. The tools 20, 22 may be mounted on reciprocating hydraulic rams or any other suitable device from moving the splitting tools 20, 22 towards one another and into engagement with the side edges 12, 14 of the metal sheet 10 and then through their inward splitting movement. A stationary holding device (not shown) is provided for holding the metal sheet 10 between the splitting tools 20, 22 while the splitting operation is performed. The holding device may be a single pair of clamping members that are located between the splitting tools 20, 22. These clamping members can be moved towards one another and brought into engagement with the centers of opposing face surfaces 16, 18 of the metal sheet 10 to hold the sheet 10 in place.

Figure 2:
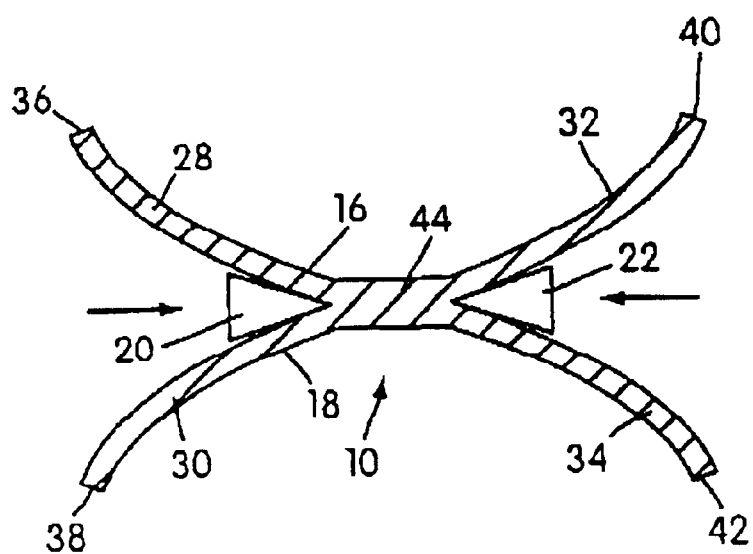
FIG. 2 is a view similar to FIG. 1 with the splitting tools moved inwardly relative to the sheet so as to create a pair of flanges on each side of the metal sheet.

FIG. 2 schematically shows the splitting tools 20, 22 being brought into engagement with the side edges 12, 14 of the metal sheet 10 and moved inwardly towards one another (i.e., towards the center web of the metal sheet 10) to perform a splitting operation. As the splitting tools 20, 22 are moved towards one another, they split portions of the sheet 10 extending inwardly from the respective edges 12,14 thereof so that the split portions of the sheet 10 are divided into a pair of flanges while leaving an unsplit central web 44. As shown in FIG. 2, the use of two splitting tools, one for each edge 12, 14, creates four flanges 28, 30, 32 and 34. The flanges 28, 30, 32, 34 have free end 36, 38, 40, 42, respectively. It is to be understood that it is within the scope of the present invention to split only one side edge of the metal sheet 10. However, it is preferred to split both side edges as shown in FIG. 2.

Figure 3:
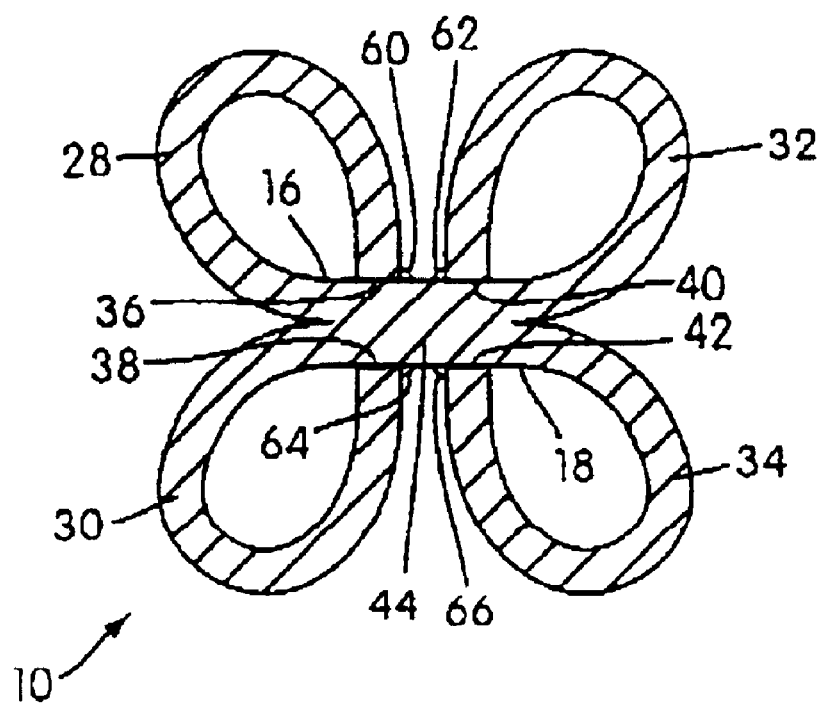
FIG. 3 is a cross-sectional view showing the flanges formed in accordance with the splitting operation of FIG. 2 bent away from one another and secured to the opposing face surfaces of the metal sheet so as to create a beam with a cross-section similar to a four-leaf clover.
Figure 4:
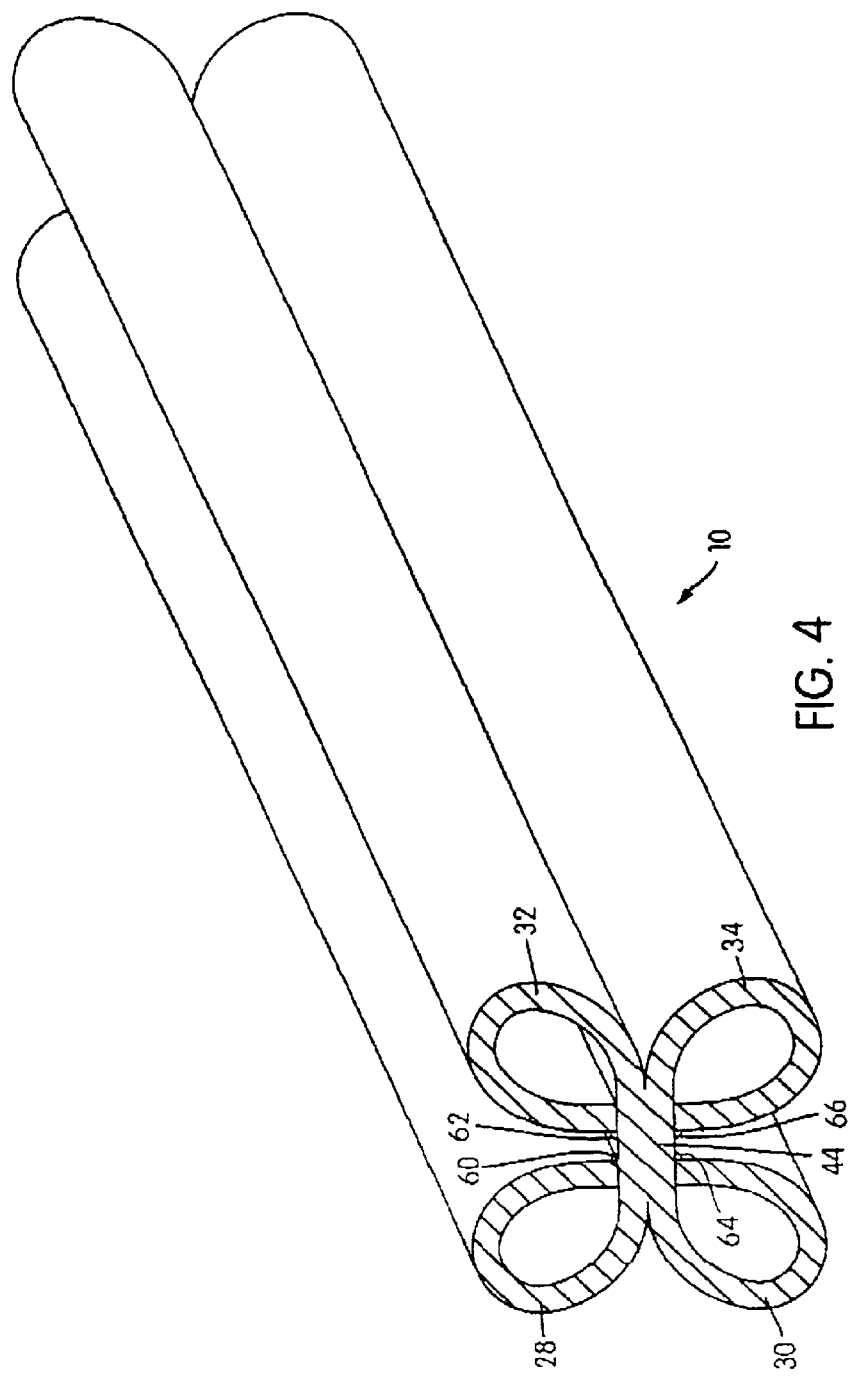
FIG. 4 is a perspective view showing the beam of FIG. 3.

In accordance to one aspect of the invention, as shown in FIGS. 3 and 4, the flanges of each pair are bent away from one another so that the free ends thereof are moved inwardly towards the unsplit central web 44. Then, the free ends are fixed to the opposing face surfaces 16, 18 at the central web 44. By doing this for all four flanges 28, 30, 32, 34, the cross-section of the resulting beam will have a four-leaf clover-like configuration. The free ends of the flanges 36, 38, 40, 42 are fixed to the first and second opposing face surfaces 16, 18 at the central web 44, preferably by welding. For example, pool welds 60, 62, 64, and 66 are illustrated in FIG. 3. Alternatively, the free ends of the flanges may be bent and rivets or other suitable fasteners may be inserted through the bent free ends so as to fix the flanges to the central web 44.

Figure 5:
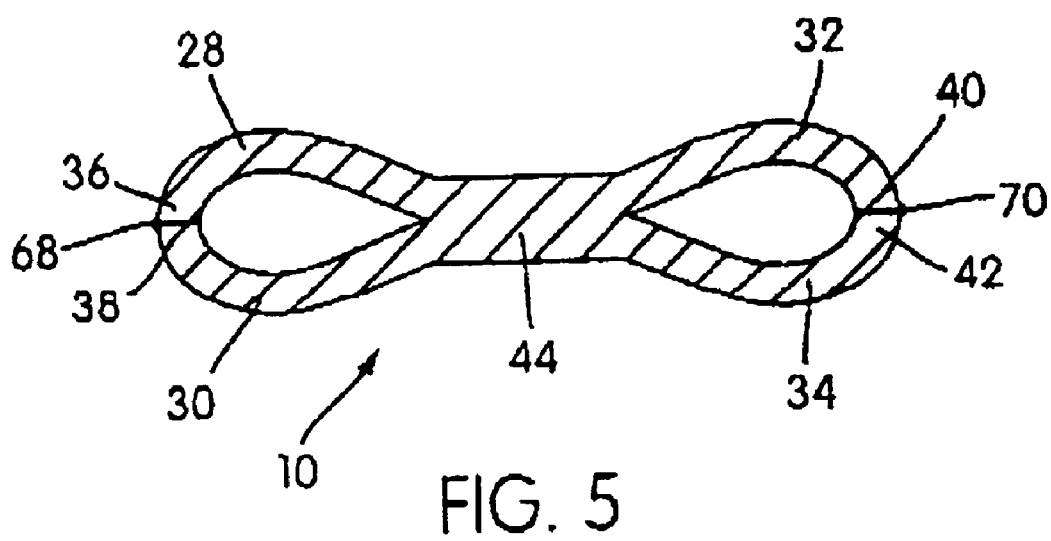
FIG. 5 is a cross-sectional view showing the flanges being attached to one another after the splitting operation of FIG. 2 so as to create a beam having two tubular portions, one tubular portion on each side.
Figure 6:
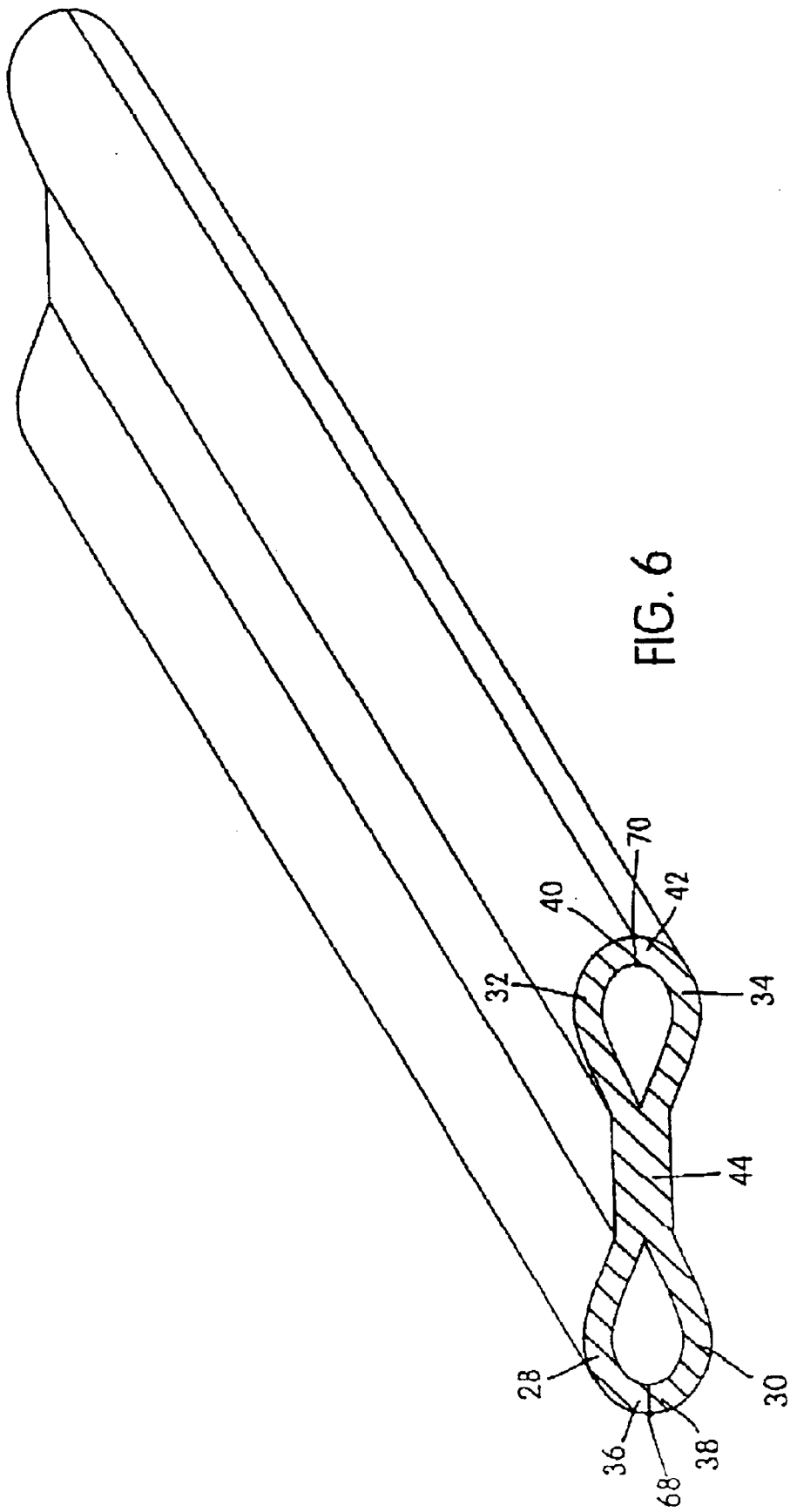
FIG. 6 is a perspective view of the beam shown in FIG. 5.

According to another aspect of the invention, the flanges 28, 30, 32, 34 may be bent so as to bring the free ends on the flanges of each pair into engagement with one another, as shown in FIG. 5. Then, the free ends are fixed to one another, preferably by welding. Seam welds 68 and 70 are illustrated in FIG. 5. Alternatively, the free ends of the flanges may be bent to form flanges and fasteners such as screws or rivets may be used to attach the bent free ends to one another. A beam formed in accordance with this aspect of the invention has a cross-section as shown in FIG. 5 and an overall configuration as shown in the perspective view of FIG. 6. The cross-sectional appearance of the beam is similar to that of a bow-tie. It should be noted that forming the beam in accordance with this aspect of the invention provides only one tubular portion on each side of the unsplit central web 44. In contrast, forming the beam in accordance with the earlier aspect of the invention (FIGS. 3 and 4) provides the resulting beam with four tubular sections, two at each edge of the central web 44.

It will thus be realized that the object of the present invention has been fully and effectively accomplished. The foregoing specific embodiments have been provided to illustrate the structural and functional principles of the present invention and are not intended to be limiting. In contrast, the present invention is intended to encompass all modifications, alterations, and changes within the scope of the appended claims.

What is claimed is:

1. A method for making a beam from a metal sheet, comprising:

providing a metal sheet having opposite first and second side edges extending longitudinally along opposing sides of the metal sheet, and first and second generally parallel opposing face surfaces provided between said first and second edges, said first and second generally parallel opposing faces defining a thickness of said metal sheet there between;

splitting the thickness of said metal sheet at one of the first and second side edges to form first and second integral flanges from a portion of the metal sheet and, simultaneously with splitting the thickness, bending the first and second integral flanges apart from one another such that inner ends of said first and second flanges remain integrally connected with an unsplit portion of said metal sheet;

bending said first and second flanges so as to provide said metal sheet with a tubular portion extending along one side of and integrally formed with said unsplit portion; and then fixing said first and second flanges against movement relative to one another.

2. A method according to claim 1, further comprising:

splitting the thickness of said metal sheet at the other of said first and second side edges to form third and fourth integral flanges from another portion of the metal sheet such that inner ends of said third and fourth flanges remain integrally connected with the unsplit portion of said sheet opposite the inner ends of the first and second flanges;

bending said third and fourth flanges so as to provide said metal sheet with another tubular portion extending along an opposite side of and integrally formed with the unsplit portion of said metal sheet; and then fixing said third and fourth flanges against movement relative to one another.

3. A method for making a beam from a metal sheet, comprising:

providing a metal sheet having opposite first and second side edges extending longitudinally along opposing sides of the metal sheet, and first and second generally parallel opposing face surfaces provided between said first and second edges, said first and second generally parallel opposing faces defining a thickness of said metal sheet there between;

splitting the thickness of said metal sheet at one of the first and second side edges to form first and second integral flanges from a portion of the metal sheet such that inner ends of said first and second flanges remain integrally connected with an unsplit portion of said metal sheet;

bending said first and second flanges so as to provide said metal sheet with a tubular portion extending along one side of and integrally formed with said unsplit portion; and then fixing said first and second flanges against movement relative to one another, wherein bending of said first and second flanges so as to provide said metal sheet with said tubular portion extending along said one side of said unsplit portion is performed by bending said first and second flanges so that the free ends of said first and second flanges are bent towards said unsplit portion and disposed adjacent said first and second face surfaces of said metal sheet so that said tubular portion comprises a pair of tubes extending along the one side of said unsplit portion, and wherein fixing said first and second flanges is performed by securing free ends of said first and second flanges to said first and second opposing face surfaces of said metal sheet respectively.

4. A method according to claim 1, wherein bending said first and second flanges so as to provide said metal sheet with said tubular portion extending along said one side of said unsplit portion is performed by bending said first and second flanges so that free ends of said first and second flanges are brought into engagement with one another so as to provide said metal sheet with a tube extending along said one side of said unsplit portion, wherein fixing said first and second flanges is performed by securing said free ends of said first and second flanges to one another.

5. A method according to claim 3, further comprising:

splitting the thickness of said metal sheet at the other of said first and second side edges to form third and fourth integral flanges from another portion of the metal sheet such that inner ends of said third and fourth flanges remain integrally connected with the unsplit portion of said sheet opposite the inner ends of the first and second flanges;

bending said third and fourth flanges so as to provide said metal sheet with another tubular portion extending along an opposite side of and integrally formed with the unsplit portion of said metal sheet; and then fixing said third and fourth flanges against movement relative to one another.

6. A method according to claim 4, further comprising:

splitting the thickness of said metal sheet at the other of said first and second side edges to form third and fourth integral flanges from another portion of the metal sheet such that inner ends of said third and fourth flanges remain integrally connected with the unsplit portion of said sheet opposite the inner ends of the first and second flanges;

bending said third and fourth flanges so as to provide said metal sheet with another tubular portion extending along an opposite side of and integrally formed with the unsplit portion of said metal sheet; and then fixing said third and fourth flanges against movement relative to one another.

7. A method according to claim 3, wherein said splitting the thickness of said metal sheet is performed by splitting the thickness of said metal sheet at one of the first and second side edges to form first and second integral flanges from a portion of the metal sheet and, simultaneously with splitting the thickness, bending the first and second integral flanges apart from one another such that inner ends of said first and second flanges remain integrally connected with an unsplit portion of said metal sheet.

* * * * *